United States Patent [19]

Sonoda et al.

[11] Patent Number: 4,607,297
[45] Date of Patent: Aug. 19, 1986

[54] APPARATUS FOR DETECTING CLOGGING OF HEAD GAP

[75] Inventors: Masakazu Sonoda, Kanagawa; Koichi Nakayama, Aichi; Toshiyuki Sado, Kanagawa, all of Japan

[73] Assignee: Sony Corporation, Tokyo, Japan

[21] Appl. No.: 596,948

[22] Filed: Apr. 5, 1984

[30] Foreign Application Priority Data

Apr. 8, 1983 [JP] Japan ................................. 58-62704

[51] Int. Cl.$^4$ ........................... G11B 5/41; G11B 5/00
[52] U.S. Cl. ..................................... 360/55; 358/335; 360/31; 360/61; 360/62; 360/64; 360/33.1
[58] Field of Search ....................... 360/31, 55, 61, 62, 360/64-81; 358/335

[56] References Cited
U.S. PATENT DOCUMENTS
4,489,354 12/1984 Dann ................................. 360/31 X FOREIGN PATENT DOCUMENTS
0066766 12/1982 European Pat. Off. .
2055239 2/1981 United Kingdom .

Primary Examiner—Robert L. Richardson
Attorney, Agent, or Firm—Lewis H. Eslinger; Alvin Sinderbrand

[57] ABSTRACT

In an apparatus having a record mode for recording video or other information signals in successive parallel information tracks on a record tape by means of a plurality of rotary heads repeatedly scanning across said tape and having respective gaps with different azimuth angles, and in which the apparatus is changeable to a playback mode for causing each of said heads to provide a respective output when it is scanning an information track in which information signals have been previously recorded by a head with a gap having the same azimuth angle; clogging of one or more of the head gaps which would prevent further recording is detected, in the playback mode, by switching from one to another of the outputs of the heads during each period required for the scanning of the tape by each of the heads, detecting the levels of the head outputs during such switching therebetween, and operating a clog indicator when the detected levels of the head outputs are insufficient during the scanning of the tape by each of the heads. In order to avoid a false clog indication, the operation of the clog indicator is inhibited when the usual fixed head does not reproduce control signals in the playback mode, for example, as when there has been no previous recording of information signals on the record tape.

15 Claims, 28 Drawing Figures

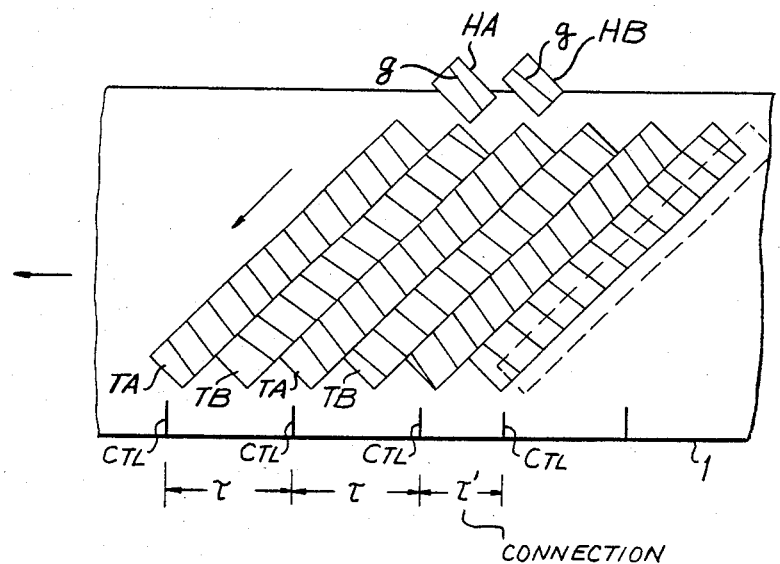
FIG.1
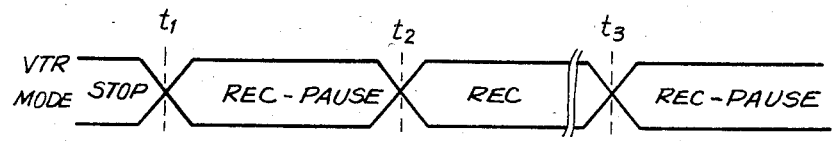
FIG.2A
FIG.2B
FIG.2C
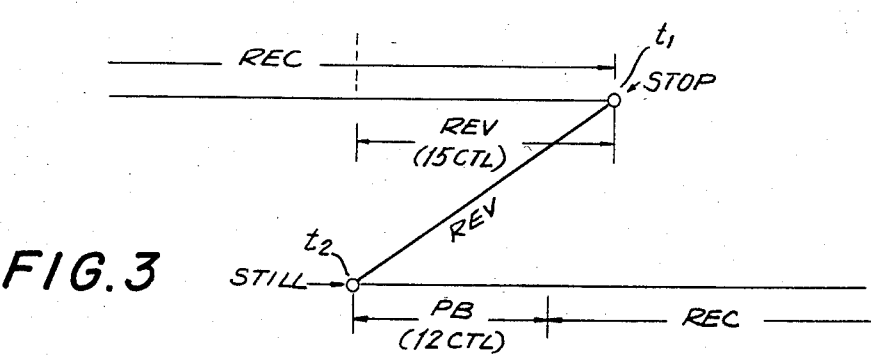
FIG.3

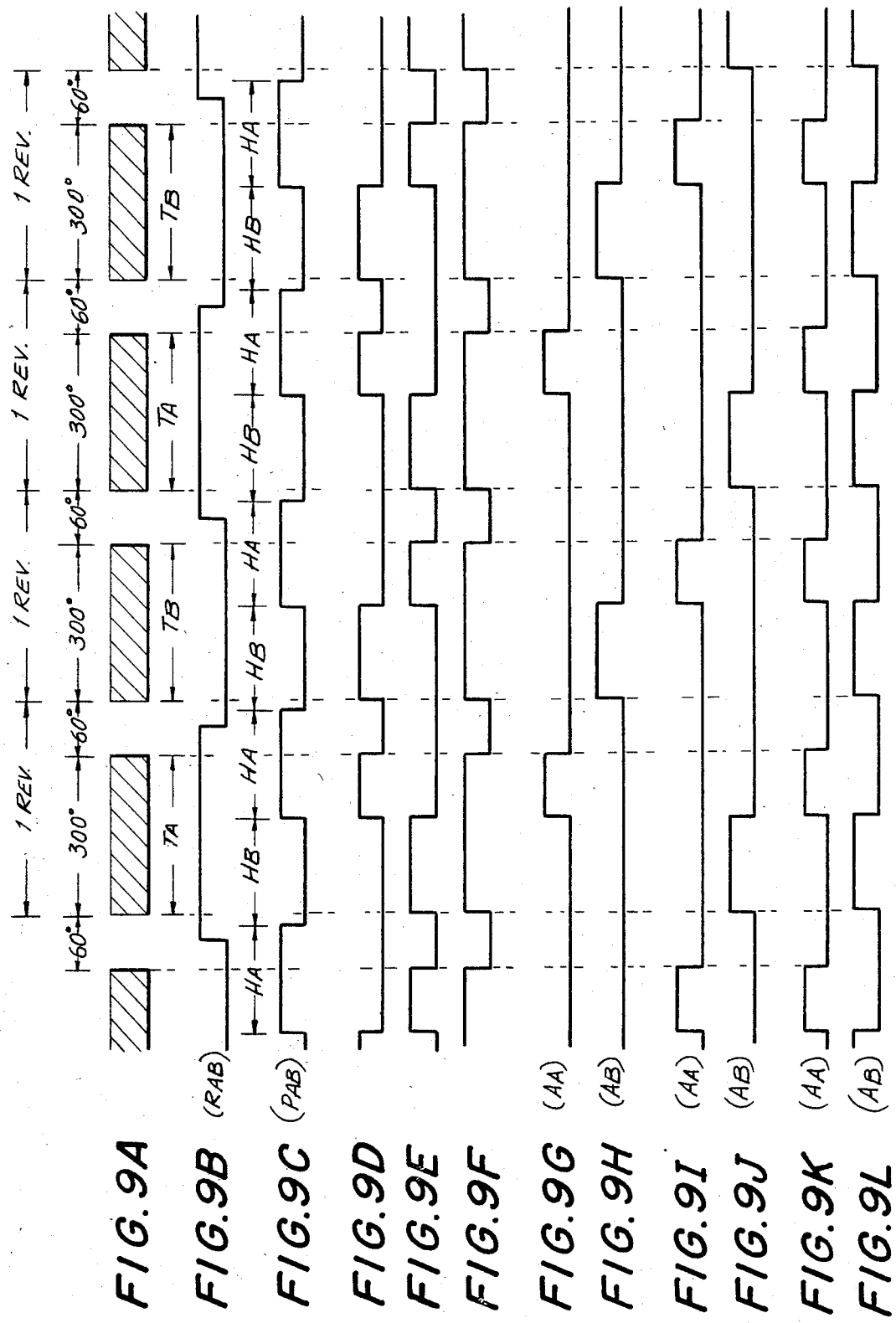

APPARATUS FOR DETECTING CLOGGING OF HEAD GAP

BACKGROUND OF THE INVENTION

1. Field of the Invention

This invention relates generally to detection of clogging of the head gaps in a recording apparatus, and more particularly is directed to such detection in an apparatus of the type which, in its record mode, records video or other information signals in successive parallel information tracks on a record tape by means of a plurality of rotary heads repeatedly scanning across the tape and having respective gaps with different azimuth angles for minimizing cross-talk during playback.

2. Description of the Prior Art

Clogging of the gaps of the rotary heads for recording video signals in a video tape recorder (VTR) sometimes occurs and prevents satisfactory recording of the incoming video signals. In a conventional VTR for home use, there is no way to detect clogging of the rotary heads during recording so that the occurrence of clogging can only be detected or determined after the fact, that is, by rewinding the recorded tape and then playing back or reproducing the same and observing the resulting picture on a monitor or television picture tube. Therefore, when a portable video camera and a conventional VTR are used for recording live action or scenes which cannot be conveniently recreated, the undetected occurrence of clogging of the head gaps is very disadvantageous in that the live action or scenes will not be recorded, or at least not recorded with satisfactory resolution and fidelity.

Accordingly, it has been proposed to provide a VTR with an additional rotary head which monitors or reproduces the information signals immediately after the same have been recorded in the skewed information tracks by the rotary recording and reproducing heads, with the result that the output of the additional monitoring head, or the absence of such output, can provide an indication of the occurrence of clogging of the gaps of the main rotary recording heads. However, the provision of an additional rotary head for monitoring the recording of the information or video signals as such recording proceeds entails increased complexity of circuits of the VTR and a consequent increase in the cost thereof.

OBJECTS AND SUMMARY OF THE INVENTION

Accordingly, it is an object of this invention to provide a VTR or similar recording apparatus with a device for detecting clogging of the gaps of the rotary recording heads, and which avoids the previously mentioned disadvantages of the prior art.

More particularly, it is an object of this invention to provide a VTR or other similar recording apparatus with a device for detecting the clogging of the recording head gaps, without employing an additional rotary head for monitoring the recorded video or information signals.

Another object is to provide an apparatus having a record mode for recording video or other information signals in successive parallel information tracks on a record tape by means of a plurality of rotary heads repeatedly scanning across the tape and having respective gaps with different azimuth angles, and in which the apparatus is changeable to a playback mode for causing each of the heads to provide a respective output when it is scanning an information track previously recorded by a head with a gap having the same azimuth angle, with a device for detecting clogging of the gaps on the basis of the outputs of the rotary heads normally used for recording.

In accordance with an aspect of this invention, a device for detecting clogging of the head gaps in a recording apparatus of the type described above comprises switching means operative in the playback mode of the apparatus for switching from one to another of the outputs of the rotary heads, switch operating means causing the switching means to effect the switching of the head outputs during the period required for the scanning of the tape by each of the rotary heads, level detecting means for detecting the levels of the head outputs obtained from the switching means and providing corresponding detected outputs, and means responsive to the detected outputs and the switch operating means for indicating clogging of at least one of the head gaps.

In a desirable embodiment of the device for detecting clogging of the head gaps in accordance with this invention, the switch operating means includes a signal generator providing a switch change-over signal for switching the switching means between the outputs of the rotary heads in response to changing states of the switch change-over signal, and the means for indicating clogging includes logic means receiving the detected outputs from the level detecting means and the switch change-over signal for providing a logic output in response to the absence of a detected output from the level detecting means for each of the states of the switch change-over signal during the scanning of the tape by at least one of the rotary heads, and at least one clog indicator actuable by the logic output.

In order to avoid a false indication of head clogging when the tape has not been previously recorded, the VTR or recording apparatus includes the usual fixed head which, in the record mode, records control signals in a control track extending along the record tape for identifying the rotary heads with which the information tracks are recorded, and which, in the playback mode, is operative to reproduce the control signals, and shut-off means is interposed between the logic means and the clog indicator and is responsive to the absence of reproduced control signals from the fixed head for inhibiting actuation of the clog indicator.

The above, and other objects, features and advantages of the invention, will be apparent in the following detailed description of an illustrative embodiment of the invention which is to be read in conjunction with the accompanying drawings forming a part hereof, and wherein corresponding parts are identified by the same reference numerals in the several views.

BRIEF DESCRIPTION OF THE DRAWINGS

FIG. 1 diagrammatically illustrates a length of magnetic tape on which video or other information signals have been recorded in a conventional helical-scan VTR, and to which reference will be made in explaining a problem encountered in achieving a smooth connection or junction between successively recorded scenes;

FIGS. 2A, 2B and 2C are graphic illustrations to which reference will be made in explaining the operating steps of a VTR for achieving the smooth connection of successively recorded scenes;

FIG. 3 is a graphic illustration of the tape movements effected during the operations described with reference to FIGS. 2A–2C;

FIGS. 9A–9L are waveform diagrams showing signals obtained at various points in the circuit of FIG. 8, and to which reference will be made in explaining the operations thereof.

DESCRIPTION OF PREFERRED EMBODIMENTS

Figure 4A:
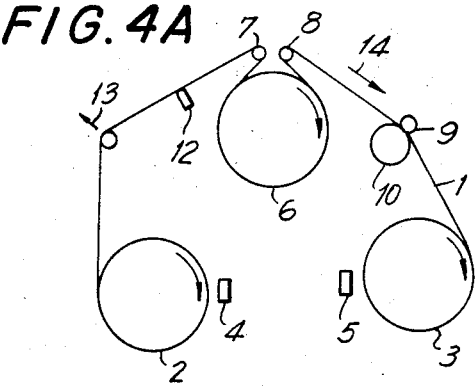
FIGS. 4A–4F are schematic illustrations of another VTR capable of effecting smooth connection of successively recorded scenes and to which the present invention may be desirably applied.

Referring to the drawings in detail, and initially to FIG. 1 thereof, it will be seen that, in the usual recording operation of a conventional VTR, one field of video signals is recorded in each of the oblique tracks $T_A$ and $T_B$ alternately traced on a magnetic tape 1 by rotary magnetic heads $H_A$ and $H_B$, respectively, which repeatedly scan across the tape and have gaps g with different azimuth angles. Simultaneously with the recording of the video or information signals in the oblique tracks $T_A$ and $T_B$, a control pulse $C_{TL}$ is recorded, as by a fixed head (not shown), along the lower edge of tape 1 at locations that are spaced apart by a constant distance or pitch $\tau$ for use in a tracking servo in the playback or reproducing mode of the VTR. As shown, the normal or standard pitch $\tau$ of control pulses $C_{TL}$ is equivalent to the distance along the tape 1 occupied by two adjacent tracks $T_A$ and $T_B$ and thus can also be used for identifying the tracks that have been recorded with the rotary heads $H_A$ and $H_B$, respectively.

When the video signals recorded on the tape 1 are the output of a portable video camera, the VTR may be operated intermittently in its recording mode for recording different scenes viewed successively with the portable camera. In such case, at the connection between the end of one recorded scene and the commencement of the next recorded scene on tape 1, the pitch or distance $\tau'$ between the last recorded control pulse $C_{TL}$ associated with the former recorded scene and the first control pulse $C_{TL}$ associated with the next or later recorded scene may be different from the standard pitch $\tau$, and the first skewed information track of the later recorded scene may overlap the last track of the earlier recorded scene, as shown in broken lines on FIG. 1. By reason of the deviation of the pitch $\tau'$ from the standard distance at the connection between two adjacent recorded scenes, the tracking servo is disturbed in the reproducing mode and causes a corresponding disturbance or disarray in the resulting displayed picture. Of course, if the pitch $\tau'$ at the connection between two adjacent recorded scenes is equal to the standard pitch $\tau$, there is no disturbance at the junction between successive scenes and the reproducing tracking servo can operate in its intended manner to provide a smooth transition between the successively reproduced scenes.

In order to maintain a constant pitch of the control pulses across the joint or connection between a previously recorded scene and a new scene to be recorded on the tape immediately thereafter, the new recording may be effected in synchronism with the control pulses $C_{TL}$ of the earlier recorded scene or video signals. In actual practice, the control pulses of the previously recorded scene or video signals are reproduced prior to commencement of the recording of the new scene and synchronization with such reproduced control signals is achieved prior to the commencement of the actual recording of the new scene.

More particularly, such a smooth recording connection is desirably effected with an existing VTR having a recording pause mode, for example, established by simultaneously depressing a RECORD push-button and a PAUSE push-button while the VTR is in its stop mode. With such a VTR initially in its stop mode at the completion of the recording of an initial scene, as indicated at STOP at the left-hand end of FIG. 2A, the recording pause mode REC-PAUSE is established by the simultaneous depressing of the RECORD and PAUSE push-buttons at the time $t_1$. In response to the establishment of the recording pause mode, the tape is automatically moved in the reverse direction or rewound, as indicated at REV on FIG. 2B, for a predetermined distance, for example, a distance equal to the continued pitch of 15 control pulses $C_{TL}$, as shown on FIGS. 2B and 3, whereupon movement of the tape is halted, as indicated at STILL. When the PAUSE push-button is again depressed at the time $t_2$, the VTR is removed from its REC-PAUSE mode and the recording mode REC (FIG. 2A) is established. Upon the establishment of the recording mode REC, the tape is moved in the forward direction and, at the commencement of such movement in the forward direction, for example, during the initial movement for a distance equal to the combined pitch of 12 control pulses or signals CTL, as well as in the preceding REC-PAUSE mode, the VTR is automatically changed over to a temporary playback mode. During such initial forward movement in the record mode REC, and while the previously recorded control signals CTL are being reproduced, as indicated at PB on FIGS. 2B and 3, the recording servo is synchronized with the played back previously recorded control pulses CTL. At the completion of the playback of 12 control pulses, synchronization has been achieved between the control pulses being reproduced and the control pulses being generated, for example, from the vertical synchronizing signals of the new video signals to be recorded, and, at that time, the VTR automatically commences actual recording, as indicated at REC on FIGS. 2B and 3. Thus, at the junction between the previously recorded video signals and the newly recorded video signals on the tape, the pitch of the control pulse is maintained uniform at the value $\tau$ so that the new skewed tracks are a continuation of the previously recorded tracks for providing a smooth connection between the old and new recorded scenes upon the reproduction and display thereof.

When the PAUSE push-button is again depressed at the time $t_3$, the VTR returns to its recording pause mode REC-PAUSE for terminating the recording of the scene existing between the times $t_2$ and $t_3$, and the procedures previously described as occurring between the times $t_1$ and $t_2$ are repeated. Thereafter, further depressing of the PAUSE push-button again removes the VTR from its pause mode and the recording of another scene is commenced with a smooth connection to the previously recorded scene.

In the above-described VTR for effecting smooth connections between successively recorded scenes, clogging of the head gaps may be detected by observing the output video signal during the movements of the tape indicated at REV, STILL and PB on FIG. 2B, because the previously recorded video signals are then reproduced or played back. Such period during which clogging can be observed or detected is indicated at OK on FIG. 2C. The described VTR capable of effecting smooth connections between successively recorded scenes and also capable of detecting clogging of the rotary heads requires a reproducing servo circuit, that is, the described procedure for obtaining smooth connections between successive recorded scenes and for detecting clogging of the rotary head gaps cannot be employed in connection with a so-called "recording-only" VTR which does not have a reproducing servo circuit.

Referring now to FIGS. 4A–4F, it will be seen that a so-called recording-only VTR, for example, one associated with a portable video camera, which is capable of providing smooth connections between successively recorded scenes has the tape 1 extending between a supply reel 2 and a take-up reel 3 which have brake shoes 4 and 5, respectively, associated therewith for controlling the rotations of the reels. The tape 1 is shown to be wrapped or loaded about a tape guide drum 6 by means of guide pins 7 and 8. A pair of rotary heads (not shown) are provided on a rotary portion of guide drum 6. The tape 1 between take-up reel 3 and guide pin 8 extends between a capstan 9 and a pinch roller 10 which are cooperative for driving the tape in the direction of the arrow 14 on FIG. 4A. A tensioning element 11, for example, in the form of a guide pin mounted on a tensioning arm (not shown), and a fixed head 12 for recording and reproducing control signals on the tape engage the latter between supply reel 2 and guide pin 7.

The movements of brake shoes 4 and 5 to and from engaged positions with reels 2 and 3, respectively, and the movements of pinch roller 10 toward and away from capstan 9 may be controlled by respective solenoids (not shown). The operations of such solenoids and the other operations of the VTR, as described below, may be suitably controlled by a microcomputer.

When the VTR is in its recording mode, as shown on FIG. 4A, brakes 4 and 5 are released and pinch roller 10 is urged against capstan 9 so that tape 1 is driven in the direction of the arrow 14 while being unwound from supply reel 2 and rewound on take-up reel 3. At the same time, tape guide drum 6 is rotated so that video signals supplied to the VTR are recorded in successive skewed tracks on tape 1 by means of the rotary heads on drum 6, and the control signals are recorded along an edge of the tape 1 by fixed head 12.

Figure 4D:
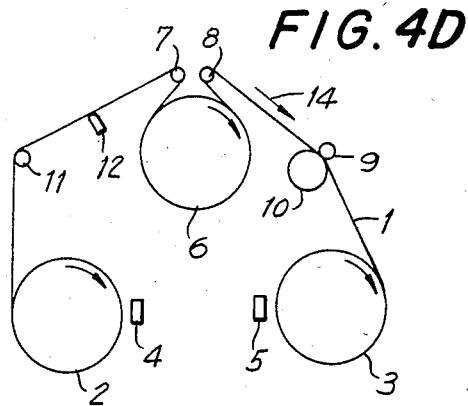
Figure 4B:
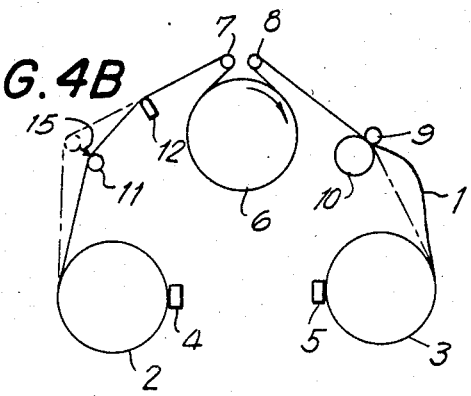
Figure 4E:
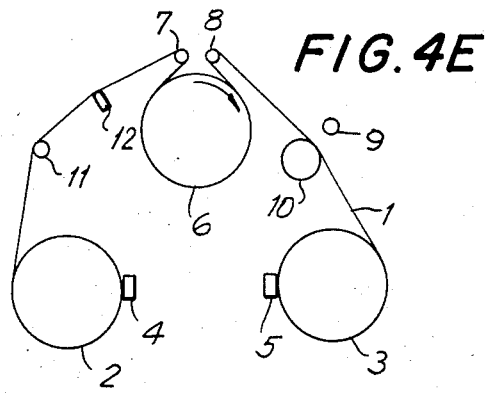
Figure 4C:
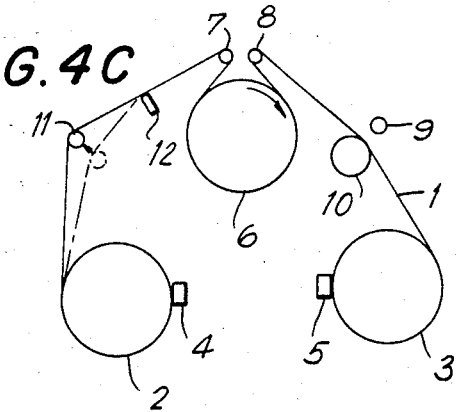
Figure 4F:
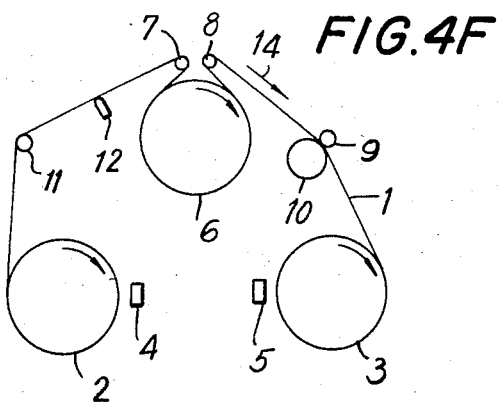

When a STOP or PAUSE push-button is depressed, suitable pulses are provided to actuate or engage brakes 4 and 5, and the rotational movements of reels 2 and 3 are halted, as shown on FIG. 4B. However, since the VTR remains in its recording mode, pinch roller 10 is still pressed against rotated capstan 9 to exert a pull on tape 1 with the result that the tension element 11 is urged to move in the direction of the arrow 15 from the position shown in broken lines to the position shown in full lines on FIG. 4B, while slack is created in the tape between the nip of capstan 9 and pinch roller 10 and the take-up reel 3. Thereafter, for example, at the completion of a time interval equivalent to ten control pulses after the rotational movements of reels 2 and 3 have been halted, pinch roller 10 is moved away from capstan 9, as shown in FIG. 4C, with the result that tension element 11 tends to return to its original position shown in full lines on FIG. 4C, and the previous slack in the tape is pulled back as the tape 1 moves in the reverse direction about drum 6 through a distance equivalent to ten control pulses. Such reverse movement of the tape stops when tension element 11 returns to its original position and the earlier mentioned slack in the tape has been removed.

When a RECORD push-button is depressed, or the PAUSE push-button is pressed again to remove the VTR from its pause mode, a suitable pulse is generated for releasing brakes 4 and 5 and for again causing pinch roller 10 to be urged against capstan 9 and thereby commence temporary forward movement of tape 1 in the direction of the arrow 14. During such temporary forward movement of the tape at the commencement of a recording operation, the playback mode of the VTR is temporarily established to permit reproducing of the information or video signals and the associated control signals on a portion of the tape that was earlier pulled back, as described with reference to FIG. 4C. During such temporary reproducing of the signals recorded near the end of the previously recorded scene, a predetermined number of the previously recorded control signals or pulses CTL, for example, seven control pulses, are counted, and thereupon the temporary forward movement of the tape in the reproducing or playback mode is arrested by engagement of the brakes 4 and 5 and movement of pinch roller 10 away from capstan 9, as shown on FIG. 4E. With the tape 1 thus temporarily stopped, the rotary phase of the rotary heads associated with tape guide drum 6 is synchronized with vertical synchronizing signals suitably separated from the new video signals to be recorded, and the control pulses or signals to be recorded are formed from the vertical synchronizing signals with which the rotary phase of the rotary heads has been synchronized. Thereafter, and based on the timing of the control pulses or signals generated for recording, brakes 4 and 5 are disengaged and pinch roller 10 is pressed against capstan 9 and, at the same time, the recording mode of the VTR is automatically established, so as to start the actual recording of the new scene, as shown on FIG. 4F.

By reason of the foregoing operations, the phase of the previously recorded control pulses after the counted seven previously recorded control pulses, and the phase of the control pulses which are to be recorded in association with the video signals representing the new scene can be made equal to each other. In other words, the sum of the distance from the previously recorded seventh counted control pulse to the point at which the tape is actually stopped in FIG. 4E and the distance from such stop point to the location on the tape at which there is recorded the first control pulse associated with the newly recorded scene is made to be a whole multiple of the standard pitch $\tau$ of the control pulses. Thus, when a recorded tape having successively recorded scenes joined as described above with reference to FIGS. 4A–4F is eventually played-back or reproduced, disturbance of the servo will not occur at the junctions of the successively recorded scenes.

When a previously recorded tape is being rerecorded from a selected point therealong, there is no need to rewind or draw back the tape as described above with reference to FIGS. 4B and 4C. In other words, the previously recorded tape has control pulses or signals previously recorded along its entire length so that, when recording a new scene over a portion of a previously recorded scene, synchronization can be effected with the control pulses already recorded on the portion of the tape at which the previously recorded video signals are to be erased and replaced by new video signals.

When the procedures described above with reference to FIGS. 4A–4F are used for achieving the smooth connections between successively recorded scenes, clogging of the head gaps can be detected by observing the outputs of the heads during the operating interval illustrated in FIG. 4D, that is, while the seven control pulses are being counted, and at which time, the VTR is temporarily in its playback mode. Although clogging of the head gaps can thus be detected in a recording-only VTR in which a reproducing servo is not required, problems are nevertheless presented thereby. More particularly, if the rotary heads of the recording-only VTR have gaps with different azimuth angles to permit high-density recording, as shown in FIG. 1, the absence of a reproducing servo raises the possibility that the rotary heads indicated at $H_A$ and $H_B$ might scan the wrong tracks during the operating interval described above with reference to FIG. 4D. If the heads $H_A$ and $H_B$ incorrectly scan the tracks $T_B$ and $T_A$, respectively, during the operating interval illustrated on FIG. 4D, video signal outputs of sufficient level will not issue from heads $H_A$ and $H_B$ due to azimuth loss. Therefore, clogging of the head gaps might be erroneously detected when the rotary heads scan tracks that were earlier recorded with heads having different azimuth angles.

Even if the recording-only VTR is provided with a reproducing servo so that eventually the rotary heads would scan and reproduce video signals previously recorded with heads having the same azimuth angles, erroneous detection of head gap clogging could still occur because the phases of the rotary heads are not fixed or synchronized with the previously recorded control pulses or signals on the tape until servo operation has occurred. In other words, clog detection could erroneously occur during the scanning of the information tracks associated with the initially counted control pulses, at which time phase synchronization has not yet occurred.

Figure 5:
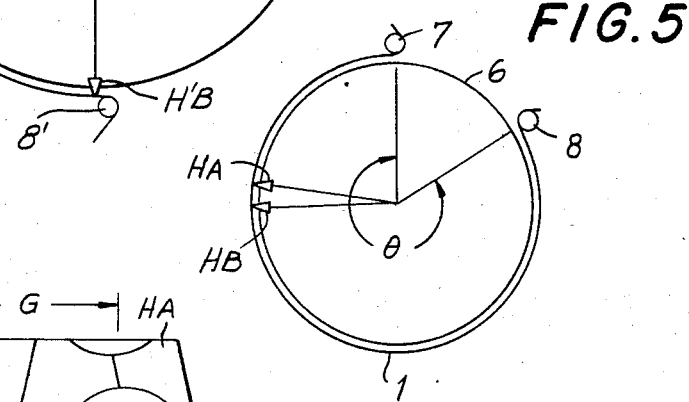
FIG. 5 is a diagrammatic plan view of a tape guide drum included in the VTR of FIGS. 4A–4F, and showing the arrangement of rotary heads thereon.

Referring now to FIG. 5, it will be seen that a VTR suitable for use with the present invention may have a drum 6 of substantially smaller diameter than a drum 6' (FIG. 7) of a conventional VTR for home use. The relatively small diameter drum 6 of FIG. 5 is inherently small and light and therefore ideally suited to be arranged in a unitary body with a portable video camera.

In the case of the relatively large diameter drum 6' (FIG. 7) of the conventional VTR intended for home use, the tape guide pins 7' and 8' for leading the tape 1' to and from the peripheral surface of drum 6' are arranged so that the tape is wrapped helically about approximately one-half of the circumference of the drum, that is, the tape has a wrap angle of approximately 180°. In this case, the two rotary heads $H'_A$ and $H'_B$ associated with drum 6' are diametrically opposed and have gaps with different azimuth angles. The rotary heads $H'_A$ and $H'_B$ are rotated with drum 6' at a speed of 30 r.p.s. so that, when the tape 1' is suitably advanced longitudinally during a recording operation of the VTR, heads $H'_A$ and $H'_B$ will alternately scan across the tape in successive field periods of the video signals being recorded for providing the record track pattern shown on FIG. 1.

The same record track pattern is formed with the drum 6 of FIG. 5 by providing a substantially larger wrap angle of the tape 1 on drum 6. More particularly, if the diameter of the drum 6 is 60 percent of the diameter of the drum 6' on FIG. 7, the guide pins 7 and 8 are arranged to provide a wrap angle $\theta$ of 300°. In that case, of course, two adjacent tracks $T_A$ and $T_B$ (FIG. 1) cannot be recorded during a single rotation of drum 6 with two rotary heads $H_A$ and $H_B$ thereon. Therefore, in the case of the relatively small diameter drum 6 of FIG. 5, a track $T_A$ is formed by head $H_A$ during one revolution of drum 6, and the next adjacent track $T_B$ is formed by head $H_B$ during the next revolution of drum 6, and heads $H_A$ and $H_B$ are positioned proximate to each other on the rotary drum. Moreover, rotary heads $H_A$ and $H_B$ are rotated with drum 6 at a rotary speed of 60 r.p.s., that is, twice the speed of rotation of the heads in a conventional VTR for home use. In the illustrated example, each field of video signals is recorded with a time compression 5/6 by the rotary head $H_A$ or $H_B$ in a respective oblique track on the tape 1 during each revolution of drum 6.

Figure 7:
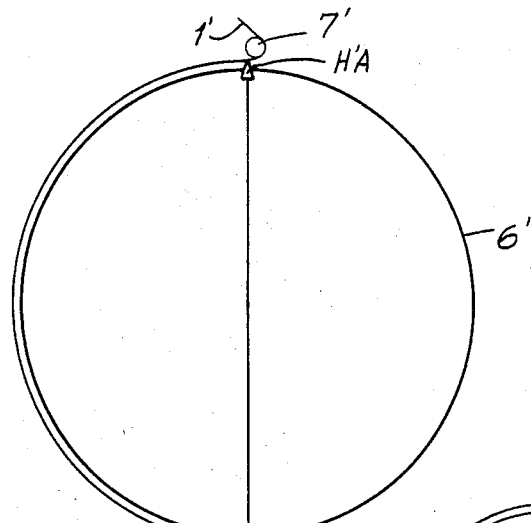
FIG. 7 is a diagrammatic plan view similar to that of FIG. 5, but showing another arrangement of the rotary heads in a VTR to which the present invention can be applied.

The angle with which the tape 1 is helically wrapped about the relatively small diameter drum 6 of FIG. 5 is selected so that the angle of the skewed record tracks relative to the longitudinal direction of the tape will be equal to such angle as produced in the conventional VTR for home use, as illustrated in FIG. 7.

The previously mentioned time compression of the video signal for recording with the head arrangement on FIG. 5 may be obviously achieved through the use of a memory. However, in the case of a VTR which is to be combined with a portable video camera in a unitary body, the time compression is desirably effected by suitable setting of the horizontal scanning frequency $f_{H'} = 360°/\theta°\ f_H$, in which $f_H$ is the standard horizontal scanning frequency. In the case of the illustrated example in which $\theta = 300°$, $f_{H'} = 6/5\ f_H$.

Since it is impossible to locate both heads $H_A$ and $H_B$ at the same position on drum 6, the recording heads $H_A$ and $H_B$ are desirably positioned with a distance between their respective gaps of G = 1.5T, in which $T = 1/f_{H'}$.

Figure 6:
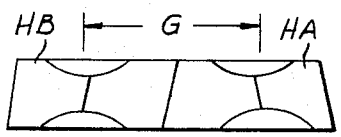
FIG. 6 is an enlarged detailed view showing the relative arrangement and spacing of the gaps of the rotary heads on the tape guide drum of FIG. 5.

When video signals recorded with time compression in successive oblique tracks on a tape by means of the heads $H_A$ and $H_B$ arranged as described with reference to FIGS. 5 and 6, are reproduced by a conventional VTR having the arrangement of its rotary heads and drum as shown on FIG. 7, the reproduced video signals are time expanded and video signals having the normal time axis are obtained.

A clog detecting device particularly suited for use with a record-only VTR of the type described above with reference to FIGS. 4A–4F and having the rotary head arrangement of FIGS. 5 and 6 will now be described with reference to FIG. 8. As there shown, a timing signal generator 30 under the control of the VTR's microcomputer indicated at 20 provides a mode control signal $M_{RP}$ to record and playback switching circuits 31 and 32. Circuit 31 is shown to have switches 31A and 31B with movable contacts connected to rotary heads $H_A$ and $H_B$, respectively, and being selectively engageable with record and playback terminals REC and PB, respectively. Switching circuit 32 similarly has its movable contact connected to a fixed head 36 and being selectively engageable with record and playback terminals REC and PB, respectively, for causing the head 36 to record or reproduce control signals CTL on the tape. The movable contacts of switching circuits 31 and 32 normally engage the respective recording terminals REC, as shown on FIG. 8, and are changed-over to engage the respective playback terminals PB in response to the mode control signal $M_{RP}$ only when the VTR, in providing a smooth connection between successively recorded scenes, is in its temporary playback mode, as described above with reference to FIGS. 4D and 4E.

A recording signal source 33 converts or time-compresses externally supplied signals, for example, color video signals from a TV camera, to a predetermined signal format which is suitable for recording by the rotary heads $H_A$ and $H_B$ arranged on drum 6 as shown on FIG. 5. Such converted video signals are supplied to a recording head selecting switch 34 which alternately engages its contacts A and B connected to the recording terminals REC of switches 31A and 31B, respectively, in switching circuit 31. Head selecting switch 34 is controlled by a recording switch change-over signal $R_{AB}$ (FIG. 9B) provided by the timing signal generator 30 when the mode control signal $M_{RP}$ is effective to cause engagement of switches 31A and 31B with their respective recording terminals REC. The recording switch change-over signal $R_{AB}$ is shown to have alternating first and second states by which head selecting switch 34 is made to engage its contacts A and B, respectively, for alternating field periods during each of which one field of the converted video signals is recorded on the tape by the head $H_A$ or the head $H_B$. During the recording operation of the VTR, recording signal source 33 further provides a control signal CTL which is supplied through an amplifier 35 to the recording terminal REC of mode selecting switch circuit 32. Thus, during the recording operation of the VTR, the control signal CTL is recorded by fixed head 36 along a longitudinal edge of the tape with a constant pitch between adjacent recorded signals.

The clog detecting device according to this invention is further shown to include a playback head selecting switching circuit 41 having contacts A and B connected to the playback terminals PB of switches 31A and 31B for receiving the outputs of rotary heads $H_A$ and $H_B$, respectively, when mode selecting switching circuit 31 is conditioned to select the playback mode. Head selecting switching circuit 41 has a movable contact which alternately engages the contacts A and B for supplying the output of head $H_A$ or $H_B$ through an amplifier 42 to a level detecting circuit 43. When the head output being supplied to level detecting circuit 43 is sufficiently high to indicate the absence of any clogging of the gap of the respective head while the latter scans a track previously recorded with a rotary head having the same azimuth angle, circuit 43 provides a logic "1" or relatively high detected output to first inputs and AND gates 44A and 44B. During the period when the mode selecting signal $M_{RP}$ from timing signal generator 30 causes switches 31A and 31B to engage their playback terminals PB, timing signal generator 30 is made by microcomputer 20 to provide a playback switch change-over signal $P_{AB}$ (FIG. 9C) which is applied to switching circuit 41 for causing the latter to alternately engage its contacts A and B. The playback switch change-over signal $P_{AB}$ is also supplied directly to a second input of AND gate 44A and through an inverter 45 to a second input of AND gate 44B. The outputs of AND gates 44A and 44B are supplied to respective integrating circuits 47A and 47B, and the resulting integrated outputs are applied to a NAND circuit 48 which provides a relatively high or logic "1" output when at least one or the other of the integrated outputs from circuits 47A and 47B is at a relatively low level. The output of NAND circuit 48 is supplied through a normally open switch 49, as a switch control signal, to a normally open switch circuit 50 associated with a clogging indicator. More particularly, such clogging indicator may include an audio frequency oscillator 51 having its output supplied through switch circuit 50 to an electro-audio transducer or loudspeaker 52. The playback terminal PB of mode selecting switch circuit 32 is shown to be connected to a control signal detector 53 so that, in the playback mode of the clog detecting circuit, control signals reproduced by fixed head 36 will be detected by circuit 53 to provide a relatively high detected output which is applied, as a switch control signal, to switch 49 for closing the latter and thereby applying the output of NAND circuit 48 to switching circuit 50. The output of NAND circuit 48 is further applied through switching circuit 49 to a circuit or device 54 by which the stop mode of the VTR is established when clogging of a head gap is detected. Further, a visual indicator 55 may be connected to the output of switching circuit 49 so as to be actuated or energized when head clogging is detected.

The operations of the clog detecting device of FIG. 8 will now be described with reference to FIGS. 9A–9L and with the assumption that the clog detecting device is associated with the VTR of FIGS. 4A–4F and 5 which can achieve smooth connections between successively recorded scenes. In that record-only VTR, mode selecting signal $M_{RP}$ from timing signal generator 30 normally maintains mode switching circuits 31 and 32 in their recording conditions, as shown on FIG. 8. Further, in the recording mode of the VTR, micro-computer 20 thereof normally causes timing signal generator 30 to provide the recording switch change-over signal R-AB to head selecting switch 34. As shown on FIG. 9B, the switch change-over signal $R_{AB}$ is alternately at relatively high and low levels during successive revolutions of heads $H_A$ and $H_B$ with drum 6 so that, during a revolution of the drum 6 in which signal $R_{AB}$ is at a high level, head selecting switch circuit 34 will be made to engage its contact A for recording a time-compressed field of the video signals from source 33 in a track $T_A$ by means of rotary head $H_A$, whereas, during the next revolution of drum 6 in which signal $R_{AB}$ is at a relatively low level, switch circuit 34 is changed-over to engage its contact B, with the result that the next field of time-compressed video signals is recorded by the head $H_B$ in a track $T_B$. At the same time that the time-compressed or converted video signals are being recorded in the successive parallel information tracks $T_A$ and $T_B$, control signals generated by recording signal source 33 in response to the vertical synchronizing signals of the video signals being recorded are supplied through amplifier 35 and mode selecting switch 32 to fixed head 36 for recording with a uniform pitch $\tau$ along a longitudinal edge of the tape 1.

When a recording operation of the VTR is interrupted or halted by depressing its PAUSE push-button, the tape 1 is halted in its movement about drum 6 and then pulled back about the latter through a distance equivalent to the pitch of ten control pulses, as previously described with reference to FIGS. 4B and 4C. Thereafter, when the PAUSE push-button is pressed again to remove the VTR from its pause mode, microcomputer 20 of the VTR controls the temporary forward movement of the tape described with reference to FIGS. 4D and 4E and causes timing signal generator 20 to provide the mode control signal $M_{RP}$ by which switches 31A and 31B of switch circuit 31 and switch circuit 32 are temporarily changed-over to engage their respective playback terminals PB. At the same time, that is, during the period when the switches 31A, 31B and 32 temporarily engage their playback terminals PB, timing signal generator 30 is controlled by microcomputer 20 to provide the playback switch change-over signal $P_{AB}$ (FIG. 9C). In the case of the embodiment of the invention being here described, and which is intended for association with a VTR of the type described with reference to FIGS. 4A–4F and 5, the playback switch change-over signal $P_{AB}$ has a frequency twice as high as the frequency of recording switch change-over signal $R_{AB}$. The application of playback switch change-over signal $P_{AB}$ to head selecting switch 41 provides that, when the VTR is temporarily in a playback mode during the temporary forward movement of the tape at the commencement of a recording operation, the outputs of heads $H_A$ and $H_B$ will be switched at every half-revolution of drum 6. In other words, each time signal $P_{AB}$ is high, the output of head $H_A$ will be connected through switch 41 and amplifier 42 to level detector 43 and, conversely, each time signal $P_{AB}$ is low, the output of rotary head $H_B$ will be connected through switch 41 and amplifier 42 to level detector 43. The phase of playback switch change-over signal $P_{AB}$ is selected so that the change-over from connection to the output of head $H_B$ to connection to the output of head $H_A$ occurs approximately at the middle of the scanning of a track $T_A$ or $T_B$. Therefore, during the scanning of the first half of each of the tracks $T_A$ and $T_B$, the level of the high frequency output of head $H_B$ is measured by level detector 43 and, during the scanning of the second half of each of the tracks $T_A$ and $T_B$, the level of the high frequency output of rotary head $H_A$ is measured.

As earlier noted, level detector 43 provides a high or logic "1" output (FIG. 9D) whenever the high frequency output of the rotary head $H_A$ or $H_B$ being applied to level detector 43 is sufficiently high or consistent with a non-clogged condition of the respective head gap. Of course, such levels of the high-frequency outputs of rotary heads $H_A$ and $H_B$ can be obtained, even if the gaps thereof are unclogged, only during the scanning by rotary head $H_A$ and $H_B$ of tracks $T_A$ and $T_B$, respectively, that is, only during the scanning of information tracks that have been recorded by heads with the same azimuth angles. In other words, the absence of a sufficient high frequency output from either of the rotary heads $H_A$ and $H_B$ at times when such heads are scanning tracks $T_B$ and $T_A$, respectively, is not an indication of head clogging. However, by switching over from the output of one head to the output of the other head approximately at the middle of each scan, and by the application of the level detecting output LD and signal $P_{AB}$ to AND gate 44A, and by the application of level detecting output LD and the inverted form of signal $P_{AB}$ to AND gate 44B, it can be determined whether there is an absence of a high level detected output or logic "1" output from detector 43 at a time when one or the other of the heads $H_A$ and $H_B$ is scanning a track $T_A$ or $T_B$, respectively, which had been recorded with a head of the same azimuth angle. Thus, it will be seen that the output $A_A$ of AND gate 44A is at a high or logic "1" level (FIG. 9G) only during the coincidence of the high level of the output of detector 43 (FIG. 9D) with the high level of the switch change-over signal $P_{AB}$ (FIG. 9C). Similarly, the output $A_B$ of AND gate 44B (FIG. 9H) is at a high or logic "1" level only during the coincidence of the high level of the output of detector 43 (FIG. 9D) with the low level of signal $P_{AB}$ (FIG. 9C). The outputs $A_A$ and $A_B$ are shown on FIGS. 9G and 9H to periodically attain high levels, as is the case when the gaps of rotary heads $H_A$ and $H_B$ are not clogged and such heads are scanning tracks on the tape 1 in which information signals have been previously recorded. The periodic high-level outputs of AND gates 44A and 44B are integrated with respect to time in integrating circuits 47A and 47B so as to provide relatively high outputs from the latter to both inputs of NAND circuit 48 with the result that the latter provides a low level or logic "0" output.

During the initial forward movement of the tape after the removal of the VTR from its pause mode, fixed head 36 reproduces the control signals CTL previously recorded along the tape 1 in association with the terminal portion of the previously recorded scene and, by reason of the engagement of switch 32 with its terminal PB, the reproduced control signals are detected by control signal detector 53 to provide a relatively high output from the latter for closing normally open switch 49. However, in response to the absence of any head clogging, that is, the output of each of AND gates 44A and 44B is logic "1", the output of NAND circuit 48 is at a low level so that switch 50 remains open to prevent operation of the audible signal provided by loudspeaker 52. Moreover, the visual indicator 55 remains inoperative as does device 54 for establishing the stop mode of the VTR.

Accordingly, if there is no clogging of the gaps of rotary heads $H_A$ and $H_B$ detected during the scanning of the skewed or oblique tracks $T_A$ and $T_B$ associated with the seven control signals being counted during the commencement of a recording operation of the VTR described with reference to FIG. 4D, the temporary forward movement of the tape is arrested, as described with reference to FIG. 4E to permit synchronizing of the phase of the rotary heads $H_A$ and $H_B$ with the vertical synchronizing signals and the control pulses or signals to be recorded. Thereafter, as earlier described, microcomputer 20 suitably recommences the forward movement of the tape, as on FIG. 4F, and causes timing signal generator 30 to return mode control signal $M_{RP}$ to the state in which switches 31A, 31B and 32 again engage their respective record terminals REC for commencing the actual recording of video signals representing the new scene with a smooth connection to the previously recorded video signals.

Since the playback switch change-over signal $P_{AB}$ alternates at a frequency or rate which is twice the rotational rate of the heads $H_A$ and $H_B$ with the drum 6, each of the AND gates 44A and 44B is opened or enabled simultaneously with its connection through switch 41 and level detector 43 to the output of the respective rotary head $H_A$ and $H_B$ at least once during each revolution of drum 6, that is, for at least a portion of the period during which the rotary heads scan across tape 1. Thus, a lack of phase synchronization during the initial temporary forward movement of the tape in providing a smooth connection between successive recorded scenes, does not affect the reliability of the detection of gap clogging. For example, if the positions of the tracks $T_A$ and $T_B$ on FIG. 9A are reversed, the level detecting circuit 43 would provide the output signal shown on FIG. 9E, and the resulting outputs of AND gate 44A and AND gate 44B would then be as shown on FIGS. 9I and 9J, respectively. Once again, high level or logic "1" portions of the outputs of AND gates 44A and 44B would occur periodically at the coincidences of the high level portions of the level detecting output LD of FIG. 9E with the high and low level portions, respectively, of the play-back switch change-over signal $P_{AB}$ of FIG. 9C. As a result of the periodic high level portions of the outputs $A_A$ and $A_B$ on FIGS. 9I and 9J, integrating circuits 47A and 47B would both apply high level signals to the respective inputs of NAND circuit 48 so that the output of the latter would be a logic "0" for indicating the absence of any head clogging.

Figure 10:
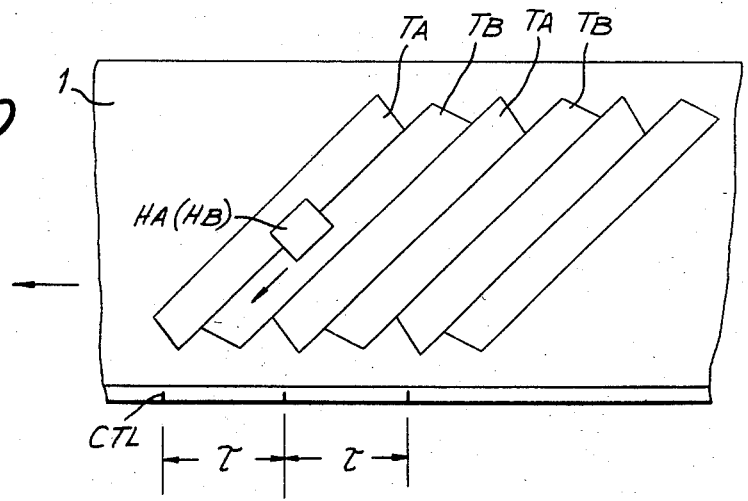
FIG. 10 is a schematic view of a section of recorded tape and to which reference will be made in explaining how the clog-detecting circuit of FIG. 8 operates even when the rotary heads scan adjacent record tracks simultaneously.

If the lack of phase synchronization of the rotary heads $H_A$ and $H_B$ with the previously recorded tracks $T_A$ and $T_B$ during the detection of clogging causes the rotary heads $H_A$ and $H_B$ to scan two adjacent tracks $T_A$ and $T_B$ at the same time, for example, as shown on FIG. 10, then the output of level detector 43 is as indicated on FIG. 9F and the outputs $A_A$ and $A_B$ of AND gates 44A and 44B are as indicated on FIGS. 9K and 9L, respectively. In this case also, since such outputs of the AND gates 44A and 44B are periodically high, they indicate the absence of head clogging.

It will be appreciated from the foregoing that outputs of the heads $H_A$ and $H_B$ are obtained as outputs of AND gates 44A and 44B, respectively, at least once during the scanning of each pair of tracks $T_A$ and $T_B$, without regard to the positions of the rotary heads relative to the skewed tracks so long as there is an absence of clogging of the rotary heads.

Of course, if, for example, the gap of head $H_A$ is clogged, there will be no output from the head $H_A$ even when the latter scans one of the tracks $T_A$ which was recorded with a head having the same azimuth angle. In the example shown on FIG. 9D, the effect of clogging of head $H_A$ would be to eliminate from the output of detector 43 those high-level portions which correspond to the high-level portions of signals $P_{AB}$ occurring during the scannings of tracks $T_A$. As a result of the foregoing, the output of AND gate 44A would be devoid of the high-level portions shown on FIG. 9G with the result that integrating circuit 47A would provide a low-level or logic "0" output and, accordingly, NAND circuit 48 would provide a logic "1" output. Assuming that switch circuit 49 is closed in response to the detection of control signals recorded on the tape, the logic "1" output of NAND circuit 48 would be transmitted to switch circuit 50 for closing the latter and thereby causing loudspeaker 52 to be energized by the output of oscillator 51 for providing an audible signal or warning. Simultaneously, the logic "1" output of NAND circuit 48 would energize the visible indicator 55 and cause device 54 to establish the stop mode of the VTR and thereby abort the recording operation.

If a blank or unrecorded tape is employed in a VTR having the device for detecting head clogging in accordance with the present invention, there will be no outputs from heads $H_A$ and $H_B$ at the commencement of the initial recording operation. Thus, the outputs $A_A$ and $A_B$ of AND gates 44A and 44B will remain at the low levels and the output of NAND circuit 48 will be logic "1". However, such output from NAND circuit 48 cannot provide a false indication of head clogging as switch circuit 49 will remain in its normal open condition by reason of the fact that there are no control signals previously recorded on the blank tape to be reproduced by fixed head 36 and detected by control signal detector 53 for closing switch circuit 49.

Since the reliable indication or detection of head clogging is achieved by the circuit embodying this invention without regard to the location or phase of the rotary heads $H_A$ and $H_B$ relative to the tracks $T_A$ and $T_B$ being scanned during the detection of head clogging, such circuit is readily applicable to VTRs which do not have a reproducing tracking servo circuit. Of course, when the circuit according to this invention is applied to a VTR which has a reproducing tracking servo circuit, the detection circuit according to this invention is still advantageous in that it provides for the reliable detection of head clogging at a time when the reproducing servo circuit has not yet been able to establish correct tracking, for example, at the commencement of a new of recording operation after a pause. Moreover, the circuit according to this invention for detecting head clogging has been shown to be reliable for that purpose even in a VTR having its rotary heads $H_A$ and $H_B$ provided with gaps having different azimuth angles so as to permit high density recording, as on FIGS. 1 and 10.

The foregoing advantages of this invention result largely from the fact that the switch circuit 41 is changed-over from one state to the other at approximately the midpoint of each scanning of the tape by the heads $H_A$ and $H_B$.

Although the circuit shown on FIG. 8 has been described in detail in association with a record-only VTR having the mode of operation described with reference to FIGS. 4A-4F and a relatively small diameter tape guide drum, as shown on FIG. 5, the invention can be similarly applied to a conventional VTR for home use which has its heads $H'_A$ and $H'_B$ diametrically opposed in respect to a relatively large diameter tape guide drum 6', as shown on FIG. 7. In the latter case, the playback switch change-over signal $P_{AB}$ applied to switching circuit 41, AND gate 44A and inverter 45 during the initial movement of the tape when effecting a smooth connection between successively recorded scenes has a frequency equal to the frequency of the recording switch change-over signal $R_{AB}$ used to control the switching circuit 34 during normal recording, but each transition of such modified signal $P_{AB}$ is timed to occur at a time when one of the heads $H_A$ or $H_B$ is approximately at the middle of the 180° wrap angle of the tape 1' on the drum 6'.

Figure 8:
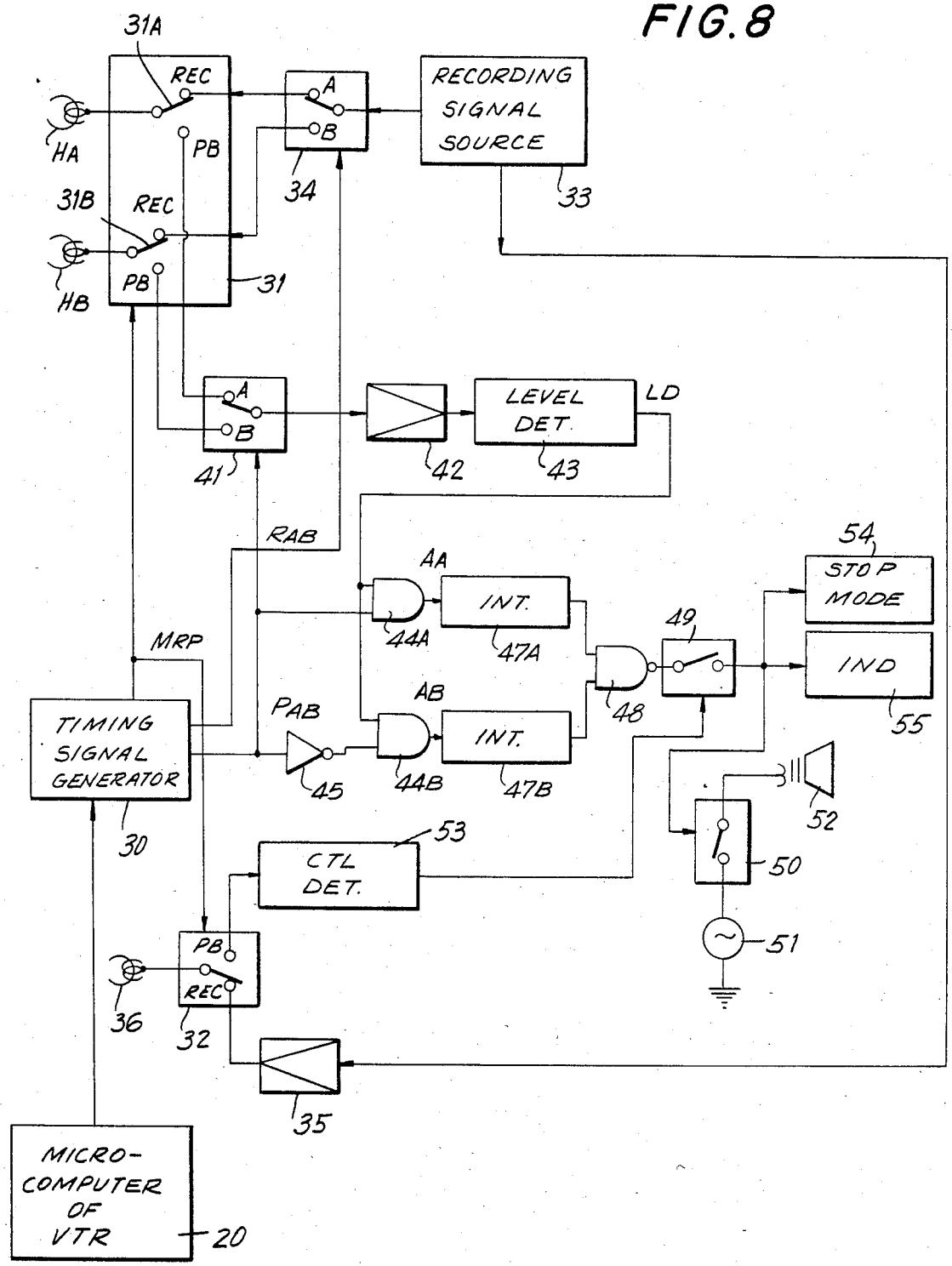
FIG. 8 is a block diagram illustrating a circuit for detecting clogging of one or more of the gaps of the rotary heads in a VTR in accordance with an embodiment of this invention.

Although the loudspeaker 52 and visual indicator 55 in FIG. 8 are arranged to be energized, and thus provide an indication of head clogging, when either one of the heads H$_A$ and H$_B$ is clogged, it is apparent that separate or individual visual or other indicators can be connected with the outputs of integrating circuits 47A and 47B, respectively, so as to be capable of separately indicating which of the heads has become clogged.

Furthermore, when the circuit for detecting clogging according to this invention is embodied in a VTR associated with a video camera in a unitary body or housing, the result of the clog detection, that is, the output of switch 49 can be added to the output of a suitable circuit (not shown) for detecting inadequate electron emission of the camera tube, whereupon the added outputs can be employed for controlling energization of a lamp or other indicator by which the user is warned of the occurrence of either head clogging or inadequate electron emission.

Although the circuit according to this invention shown on FIG. 8 has been described in association with the record-only VTR of FIGS. 4A–4F, in which a short length of the tape is pulled back around drum 6 at the completion of each recording operation, for example, whenever there is a pause in recording, so that there are recorded information tracks available to be scanned by the rotary heads H$_A$ and H$_B$ when the VTR is withdrawn from its pause mode, the clog detecting circuit according to this invention can be applied to any other VTR in which previously recorded information tracks are available to be scanned by the rotary heads at the commencement of a new recording operation.

Having described illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an apparatus having a record mode for recording information signals in successive parallel information tracks on a record tape by means of a plurality of rotary heads repeatedly scanning across said tape and having respective gaps with different azimuth angles, and in which the apparatus is changeable to a playback mode for causing each of said heads to provide a respective output when it is scanning one of said information tracks in which information signals have been previously recorded by a head with a gap having the same azimuth angle, a device for detecting clogging of said gaps comprising:
switching means operative in said playback mode for switching from one to another of the outputs of said heads;
switch operating means causing said switching means to effect said switching of the head outputs during the period required for said scanning of the tape by each of said heads;
level detecting means for detecting the levels of said head outputs obtained from said switching means and providing corresponding detected outputs; and
means responsive to said detected outputs and said switch operating means for indicating clogging of at least one of said head gaps.

2. An apparatus according to claim 1; further comprising a fixed head which, in said record mode, records control signals in a control track extending along the record tape for identifying the rotary heads with which said information tracks are recorded, and which, in said playback mode, is operative to reproduce said control signals; and wherein said means for indicating clogging is rendered inoperative in the absence of said reproduced control signals.

3. An apparatus according to claim 2; wherein said switch operating means includes signal generating means providing a switch change-over signal supplied to said switching means for switching the latter between said outputs of the rotary heads in response to changing states of said switch change-over signal; and said means for indicating clogging includes control signal detecting means connected with said fixed head in said playback mode and providing an output in response to said reproduced control signals, logic means receiving said detected outputs from said level detecting means and said switch change-over signal and providing a logic output in response to the absence of a detected output from said level detecting means for each of said states of the switch change-over signal during the scanning of the tape by at least one of said rotary heads, at least one clog indicator actuable by said logic output, and shut-off means interposed between said logic means and said clog indicator and responsive to the absence of an output from said control signal detecting means for inhibiting actuation of said clog indicator.

4. An apparatus according to claim 1; wherein said switch operating means includes signal generating means providing a switch change-over signal supplied to said switching means for switching the latter between said outputs of the rotary heads in response to changing states of said switch change-over signal; and said means for indicating clogging includes logic means receiving said detected outputs from said level detecting means and said switch change-over signal and providing a logic output in response to the absence of a detected output from said level detecting means for each of said states of the switch change-over signal during the scanning of the tape by at least one of said rotary heads, and at least one clog indicator actuable by said logic output.

5. An apparatus according to claim 4; further comprising means responsive to said logic output for halting further operation of the apparatus in said record mode.

6. An apparatus according to claim 4; wherein said clog indicator includes an electro-audio transducer, an audio frequency oscillator, and an indicator control switch interposed between said oscillator and said transducer and being closed in response to said logic output for causing said transducer to emit an audible alarm.

7. An apparatus according to claim 4; wherein there are first and second of said rotary heads; said switch change-over signal has a first high state and a second low state for which said switching means is switched to the outputs of said first and second rotary heads, respectively; and said logic means includes first and second AND gates having respective first inputs connected with said level detecting means for receiving said detected outputs and respective second inputs, said second input of the first AND gate receiving said switch change-over signal so that said first AND gate is enabled by said first high state of the switch change-over signal, an inverter through which said switch change-over signal is supplied to said second input of said second AND gate so that the latter is enabled by said second low state of the switch change-over signal, means for integrating the outputs of said first and second AND Gates, and NAND means receiving the integrated outputs of said first and second AND gates and providing said logic output in response to a low level of either of said integrated outputs.

8. An apparatus according to claim 7; wherein said rotary heads are associated with rotatable guide drum means about which the record tape is wrapped for an angular extent substantially greater than 180°, each of said information tracks is recorded by a respective one of said rotary heads during a revolution of the guide drum means, and, in said playback mode, said switch change-over signal alternates between said first and second states at a rate which is twice the rotational rate of said rotary heads with said guide drum means.

9. An apparatus according to claim 8; wherein, during each revolution of said rotary drum means in said playback mode, the alternations of said switch change-over signal between said first and second states are timed to occur approximately at the beginning of the scanning of the record tape by one of said rotary heads and then substantially at the midpoint of the scanning of the tape by said one rotary head.

10. An apparatus according to claim 9; wherein said information signals are video signals, and one field of said video signals is recorded in each of said information tracks, and said rotary heads are rotated with said rotatable guide drum means at a rate equal to the field rate of said video signals.

11. An apparatus according to claim 7; wherein said rotary heads are substantially diametrically opposed on rotatable guide drum means about which the record tape is wrapped for an angular extent of substantially 180°, each of said information tracks is recorded by a respective one of said rotary heads during a half-revolution of the guide drum means, and, in said playback mode, said switch change-over signal alternates between said first and second states at a rate which is twice the rotational rate of said guide drum means, with the alternations of said switch change-over signal between said first and second states being timed to occur approximately at the midpoints of the scannings of the tape by said rotary heads.

12. An apparatus according to claim 1; wherein there are two of said rotary heads associated with rotatable guide drum means about which the record tape is wrapped for an angular extent substantially greater than 180°, each of said information tracks is recorded by a respective one of said rotary heads during a revolution of the guide drum means, and, in said playback mode, said switching means is made to switch between said outputs of the two heads at a rate which is twice the rotational rate of said rotary heads with said guide drum means.

13. An apparatus according to claim 12; wherein, during each revolution of said rotary drum means in said playback mode, each of the switchings between said outputs of the two rotary heads is timed to occur approximately at the beginning of the scanning of the record tape by one of said rotary heads and then substantially at the midpoint of the scanning of the tape by said one rotary head.

14. An apparatus according to claim 13; wherein said information signals are video signals, and one field of said video signals is recorded in each of said information tracks, and said rotary heads are rotated with said rotatable guide drum means at a rate equal to the field rate of said video signals.

15. An apparatus according to claim 1; wherein there are two of said rotary heads substantially diametrically opposed on rotatable guide drum means about which the record tape is wrapped for an angular extent of substantially 180°, each of said information tracks is recorded by a respective one of said rotary heads during a half-revolution of the guide drum means, and, in said playback mode, said switching means is made to switch between said two rotary heads at a rate which is twice the rotational rate of said guide drum means, with the switching between the rotary heads being timed to occur approximately at the midpoints of the scannings of the tape by said rotary heads.

* * * * *